United States Patent
Eschenfelder et al.

(10) Patent No.: US 6,517,769 B2
(45) Date of Patent: Feb. 11, 2003

(54) METHOD AND APPARATUS FOR PRODUCING A STRUCTURAL UNIT MADE OF FIBER REINFORCED MATERIAL

(75) Inventors: Peter Eschenfelder, Waldkraiburg (DE); Walter Oefner, Otterfing (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/867,721

(22) Filed: May 29, 2001

(65) Prior Publication Data

US 2001/0048995 A1 Dec. 6, 2001

(30) Foreign Application Priority Data

May 31, 2000 (DE) .......................................... 100 27 129

(51) Int. Cl.[7] ............................................... B29C 70/48
(52) U.S. Cl. .................... 264/571; 425/390; 425/405.1; 425/129.1; 264/257; 264/316
(58) Field of Search ..................... 425/89, 389, 390, 425/129.1, 405.1; 264/513, 510, 511, 257, 258, 316, 571

(56) References Cited

U.S. PATENT DOCUMENTS

| | | | | |
|---|---|---|---|---|
| 4,808,362 A | * | 2/1989 | Freeman ..................... 264/102 |
| 5,183,619 A | * | 2/1993 | Tolton ........................ 141/114 |
| 5,322,665 A | * | 6/1994 | Bernardon et al. ......... 156/285 |
| 5,643,522 A | * | 7/1997 | Park ........................... 122/7 R |
| 5,702,663 A | * | 12/1997 | Seemann .................... 264/258 |
| 5,807,593 A | * | 9/1998 | Thompson .................. 264/316 |
| 5,863,452 A | * | 1/1999 | Harshberger et al. ....... 249/105 |

\* cited by examiner

Primary Examiner—Robert Davis
Assistant Examiner—Brian L Mutschler
(74) Attorney, Agent, or Firm—W. F. Fasse; W. G. Fasse

(57) ABSTRACT

For producing a structural component of fiber-reinforced material by a resin transfer molding process, a preform unit is inserted in a form tool including upper and lower metal molds enclosing the perform unit therebetween, without a seal between the molds. The preform unit includes a resin-impregnatable and curable preform body of reinforcing fibers, and an envelope that encloses the preform body and includes an envelope sleeve and closures with valves at the two ends thereof. The sealed envelope is evacuated around the preform body through one valve, and resin is injected through the other valve. The envelope prevents resin discharge from the unsealed form tool during resin impregnation of the preform body.

14 Claims, 2 Drawing Sheets

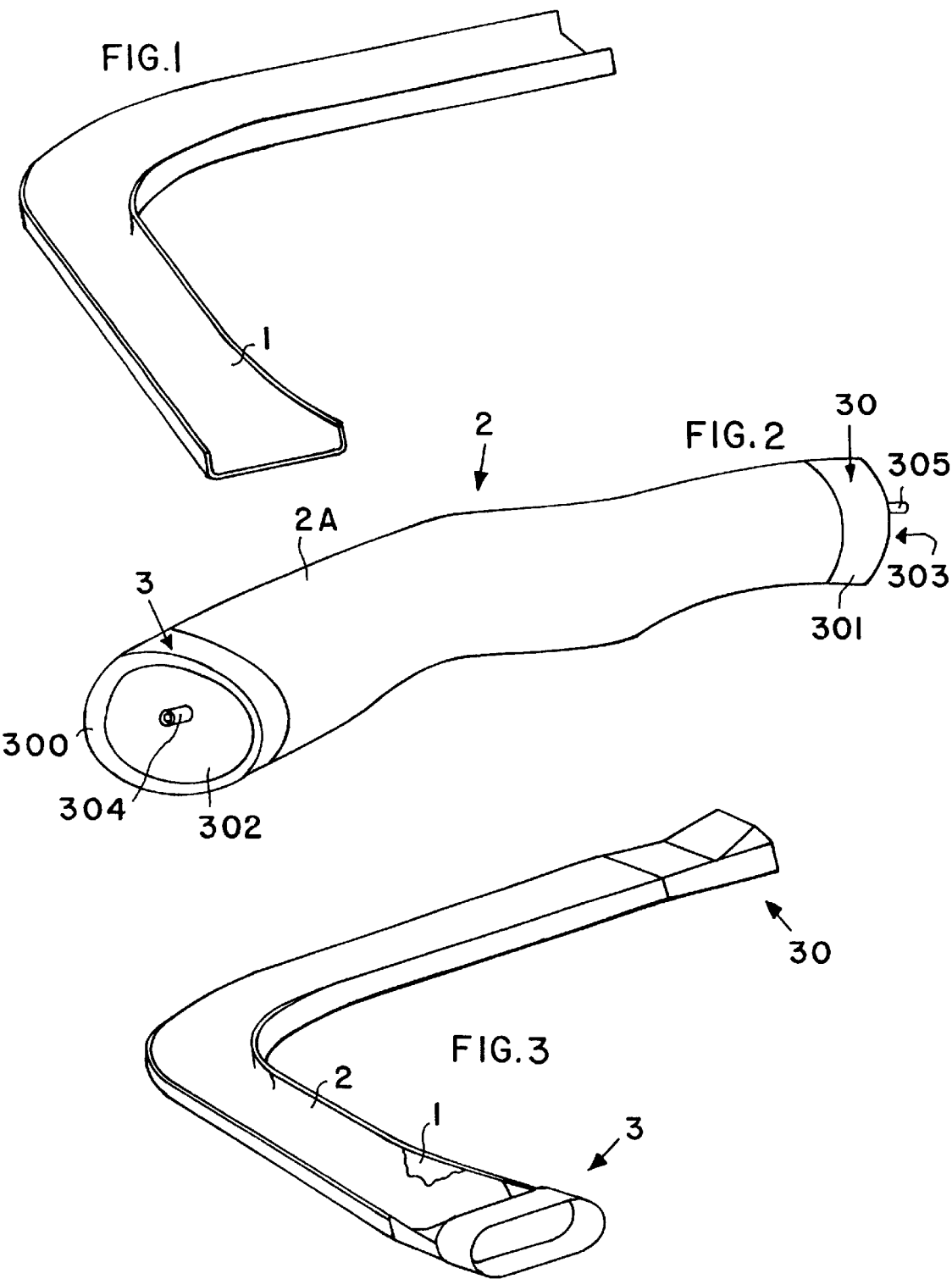

METHOD AND APPARATUS FOR PRODUCING A STRUCTURAL UNIT MADE OF FIBER REINFORCED MATERIAL

PRIORITY CLAIM

This application is based on and claims the priority under 35 U.S.C. §119 of German Patent Application 100 27 129.4, filed on May 31, 2000, the entire disclosure of which is incorporated herein by reference.

FIELD OF THE INVENTION

The invention relates to a preform for producing a structural unit made of fiber reinforced material. The preform is insertable in a form tool used in an RTM process in which the preform is resin-impregranted and cured. The form tool comprises a metal form with an upper mold and a lower mold, with the metal form enclosing the preform.

BACKGROUND INFORMATION

The RTM (resin transfer molding) process is used to produce a structural unit made of fiber reinforced material. The term RTM process includes a multitude of different processes. In the RTM process, it is known to use a sealing form tool which completely encloses a preform. The shape of the preform is the same as that of the structural unit. Thick-walled monolithic structural units which require precise external dimensions are made according to an RTM process which uses a metal form. The metal form comprises an upper mold and a lower mold which can be joined to form a seal. The upper mold and the lower mold as well as the insert components enclose the structural unit and result in a closed and sealed form tool. The air in the form tool can be evacuated via a connector. The connector is connected to a suction device and an injection device. Both devices are controllable. The preform, which corresponds to the structure of the structural unit, is inserted in this form tool and subsequently impregnated with a reaction resin mass before being cured. The reaction resin mass is a mixture of resin and hardener, for the sake of brevity subsequently referred to as "resin". The result is a structural unit made of fiber reinforced material.

The preform comprises reinforcing fiber material or layers of fiber materials which can already be spatially arranged. They can also already be fabricated so as to comprise other structural sub-units.

The metal form as a form tool comprises a base plate, a so-called bell, and forming or molding insert components which can be inserted between the base plate and the bell. The insert components determine the external shape of the structural unit. Between the base plate and the bell, at least on the circumference, a sealing means is arranged so as to prevent the resin from escaping during injection. This metal form can be clamped between an upper and a lower heatable press plate. In addition, the metal form is necessary because injection of the liquid resin takes place at high pressure (up to 30 bar) and high temperature (approx. 180° C.).

To ensure homogenous impregnation of the preform with resin, the so-called insert components must be made so as to be dimensionally accurate in relation to each other and in relation to the bell and the base plate, so that no flow channel can arise between the resin inlet on one side of the form tool and the outlet on the opposite side of the form tool. Formation of such a flow channel is frequently caused by a lack of dimensional accuracy in the insert components or by unevenness on the fitting surface between the base plate and the bell. Such lack of dimensional accuracy can also cause leakages of vacuum and of resin from the closed form tool in spite of the sealing means, causing uncontrolled resin discharge. This jeopardizes continuous and homogenous impregnation of the preform.

SUMMARY OF THE INVENTION

In view of the above, it is an object of the invention, during production of a structural unit of fiber reinforced material according to the RTM process, to prevent resin discharge from the form tool enclosing the structural unit during resin impregnation of the preform. The invention further aims to avoid or overcome the disadvantages of the prior art, and to achieve additional advantages, as apparent from the present specification.

The above objects have been achieved according to the invention, in a preform unit for producing a structural unit of fiber reinforced material, in a forming system and in a forming method.

The preform unit according to the invention comprises a preform body and an envelope in which the preform body is enclosed. For simplicity in this specification, the preform body itself or the overall preform unit are sometimes referred to as merely as "the preform".

The preform body of the preform unit comprises reinforcing fiber material or layers of fiber material which can already be spatially arranged and fabricated so as to comprise other structural sub-units. The term "reinforcing fibers" is broad and general, and refers to any fibers, strands, threads, whiskers or the like having a generally elongated shape, any suitable length, and being arranged as a woven web, a knitted sheet, a non-woven fleece, an oriented fiber mat or batt, or a random non-oriented fiber mat or batt, for example.

The envelope of the preform unit comprises an envelope sleeve or wall and at least one connector or closure arrangement (generally at least two) with closeable apertures. The envelope completely encloses the preform body. One of the two closeable apertures of the envelope is required for evacuating (by suction) air from the envelope so that the envelope hugs the preform with a positive fit. The preform with the envelope surrounding it is inserted in the form tool after the air has been evacuated from the space between the envelope and the preform. The other of the two closeable apertures is for injecting resin into the envelope and into the preform therein after the envelope has been evacuated and placed in the form tool. The envelope preferably comprises an elastic plastic material enclosing the preform, e.g. shaped as a hose, tube or pillow. Other shapes are also possible. The plastic material is air-impermeable and resistant to chemical attack by the resin. The envelope can either enclose or not enclose the forming insert components, as desired.

By using an envelope to enclose the preform, it is no longer necessary to provide a seal for the form tool. This results advantageously in a considerably simplified design of the form tool. Moreover, by using an envelope, the previous use of release agents between the insert components and the form tool or between the preform and the form tool is now no longer necessary. The envelope ensures that the form tool does not come into contact with resin. Thus, further use of the release agent is no longer necessary. Since the form tool no longer comes into contact with resin, there is a significant reduction in expenditure for subsequent cleaning of the form tool. The previously necessary use of solvents for removing resin from the form tool is no longer required.

The envelope also provides a convenient packaging for the preform. Through the use of the envelope, the preform is ready to be stored and transported.

BRIEF DESCRIPTION OF THE DRAWINGS

In order that the invention may be clearly understood, it will now be described in connection with example embodiments, with reference to the accompanying drawings, wherein:

FIG. 1 is a schematic perspective view of a preform body before it is arranged in an envelope according to the invention;

FIG. 2 is a schematic perspective view of an envelope according to the invention;

FIG. 3 shows the preform body in the envelope in the evacuated state;

Figure 4:
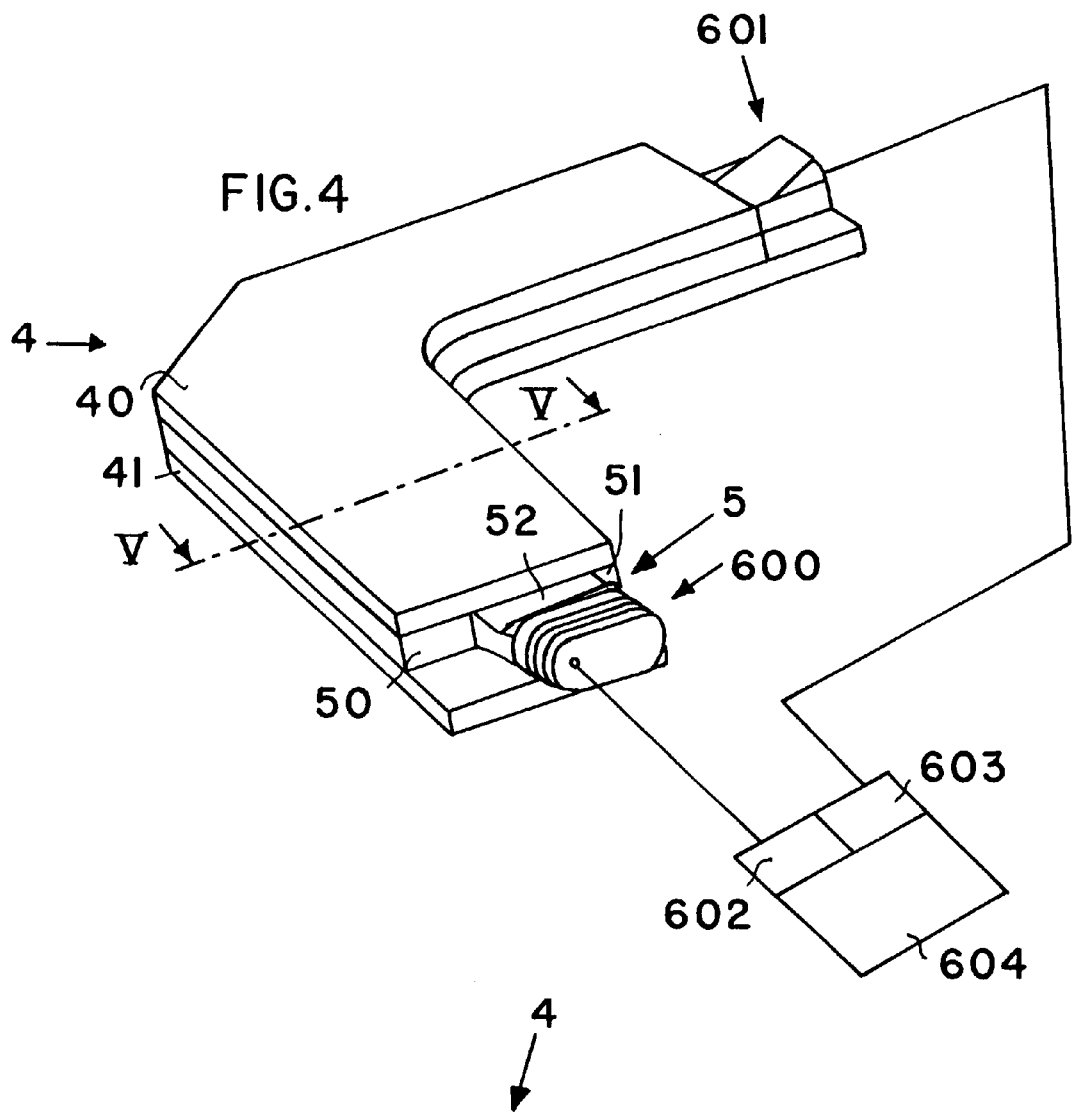
FIG. 4 schematically shows a form tool with the inserted preform and evacuated envelope as well as associated connector or closure arrangements.

DETAILED DESCRIPTION OF PREFERRED EXAMPLE EMBODIMENTS AND OF THE BEST MODE OF THE INVENTION

FIG. 1 shows a possible example preform body (or simply preform) 1 which is U-shaped in cross-section. But the process also allows other geometric shapes of the preform. The preform body comprises a fiber material or knitted fabric. There is no limit to arranging this fiber material or knitted fabric in several layers one on top of the other. As shown in FIG. 1, the preform 1 can already be of three-dimensional shape. It would also be possible for the preform 1 additionally to be fabricated so as to comprise made-up or composite parts.

The preform 1 reflects the basic shape of the structural unit to be produced. The preform 1 can, for example, be in the shape of a support which may be used as a structural unit for an airframe or cell structure in the production of a helicopter. Apart from producing the preform, production of a structural unit in the fiber reinforced material process further requires impregnation of the preform with resin, and subsequent curing. To be able to produce a structural unit in the RTM process, a form tool which is closed with respect to its surroundings is required, into which form tool the preform is inserted and subsequently impregnated with resin before finally being cured in the form tool, as will be discussed below.

FIG. 2 shows an envelope 2 comprising an envelope sleeve 2A as well as connector or closure arrangements 3 and 30 provided at the ends thereof. The geometric shape of the envelope 2 depends on the geometry of the preform 1 to be enveloped. In the embodiment shown, the preform 1 is a U-support with a right-angle bend. In the case of such a preform 1, a tubular envelope sleeve 2A is sensible as it is of optimal shape. For the envelope sleeve 2A, advantageously an elastic material is used. An elastic plastic film is very well suited to this. The elastic plastic film of hose shape provides a complete seal along its circumference. The film must be air-impermeable and resistant to attack by the resin material. On the two open ends of the film tube, connector or closure arrangements 3 and 30 are arranged. The closure or connector arrangements 3, 30 can for example comprise an outer ring collar 300, 301 which respectively surrounds one end of the plastic film tube, with a respective cylindrical disk plug 302, 303 being insertable into the open end of the film tube within the outer ring 300, 301 after the preform 1 has been placed into the envelope 2. Thus, in its final position, the film is tightly clamped between the ring 300, 301 and the cylindrical disk 302, 303 at the two opposite ends thereof.

The cylindrical disk plug respectively includes a valve 304, 305. The envelope 2 ensures that no liquid resin contacts the surrounding form tool. The connector arrangement 3 can, for example, be connected via its valve 304 to a suction device, while the connector arrangement 30 can, for example, be connected via its valve 305 to an injection device for injecting liquid resin. Thereby, the envelope 2 itself is evacuated by applying vacuum suction, and has resin injected therein from a resin injector. The envelope 2 provides all of the required sealing around the preform, so that no further sealing of the form tool is necessary.

FIG. 3 shows the preform 1 with envelope 2 in its evacuated state. Following the shape of preform 1, the envelope 2 is of tubular shape. Each of the two ends of the envelope 2 comprises a connector arrangement 3 and 30. In principle, the envelope 2 should match the respective preform 1. The envelope 2 can alternatively be pillow-shaped or spherical-shaped, i.e. it can be of any geometric shape that completely encloses the preform. The envelope 2 comprises a relatively thin elastic material. This can, for example, be a plastic film as described above. The envelope 2 comprises at least two closeable apertures (e.g. valves 304, 305) with one at least being arranged in connector arrangement 3 and the other in connector arrangement 30. One of the two closeable apertures is required to evacuate (by suction) the air from the envelope 2 so that the envelope 2 hugs the preform 1 with a positive fit. This is necessary to be able to place the preform 1 in a form tool. FIG. 3 shows this evacuated state. For the sake of clarity, FIG. 3 shows an interruption in the envelope 2 so as to show the preform 1 located therein.

FIG. 4 shows a form tool 4 with an inserted preform and evacuated envelope 2 and the respective connector arrangement 600, 601. For example, connector arrangement 600 is connected via its value to a suction device 602, while connector arrangement 601 is connected via its valve to an injection device 603. Both suction device 602 and injection device 603 are controlled by a control device 604. Liquid resin which impregnates the preform is injected via the valve of the connector arrangement 601. The suction device 602 sucks air and then the resin in the direction of the connector arrangement 600 so that the preform is completely and homogeneously impregnated with resin.

Figure 5:
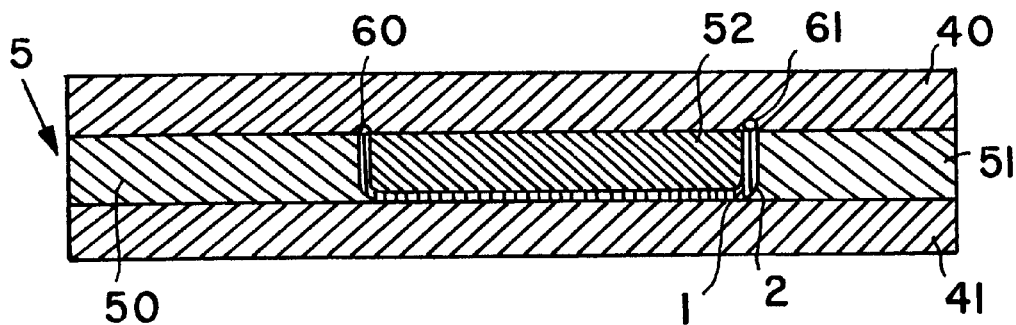
FIG. 5 shows a cross-section of the form tool with the inserted preform and evacuated envelope.

FIG. 5 shows the cross-section V—V of a form tool 4 according to FIG. 4. The form tool 4 comprises an upper mold 40 and a lower mold 41. Between the upper mold 40 and the lower mold 41 there is the preform 1 enclosed in the envelope 2. The side parts 50, 51 as well as an inner insert part 52 are used as forming insert components 5. These insert components 5 determine the exterior shape of preform 1. FIG. 5 shows that the preform 1 is completely encased by the envelope 2. It also shows that the envelope 2 forms a channel 60, 61 along each of the two U-shaped legs of the preform 1. Channel 60 is used for forward feed and is for example connected to connector arrangement 600. Channel 61 is used for return feed and is connected to connector arrangement 601. A suction device 602 is connected to the connector arrangement 600 (FIG. 4), with said suction device 602 sucking the liquid resin during the injection process. An injection device 603 is connected to connector arrangement 601 which injects resin into the envelope 2 with the preform 1 therein. Both device 602, 603 are controlled by a control device 604.

The preform 1 with the envelope 2 as well as the insert components 5, is clamped between the upper mold 40 and the lower mold 41. Both are connected to a heater, e.g. an electric heater, so that the thermal energy is transferable to the insert components 5 and the preform 1 via the upper mold 40 and the lower mold 41. The heater is in operation during the injection process and the subsequent curing process. FIG. 5 shows that form tool 4 does not require a seal. In other words, the mold cavity formed within form tool 4 does not need to be absolutely vacuum-tight or resin-tight, because the vacuum and the resin are sealed around the preform 1 by the envelope 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A forming system for carrying out a resin transfer molding process, comprising:
    a first metal mold tool and a second metal mold tool that are openable and closeable relative to each other so as to selectively open or close a mold cavity that is formed by said first and second metal mold tools;
    a resin injection device adapted to provide a curable resin; and
    a preform unit for producing a fiber-reinforced composite structural component;
    wherein said preform unit is arranged in said mold cavity and comprises:
        an envelope which includes an envelope sleeve and a first closure arrangement that closes a first end of said envelope sleeve and that is connected to said resin injection device, and
        a preform body which is arranged, surrounded and completely enclosed within said envelope and which includes reinforcing fibers arranged with spaces therebetween in an initial state, and a curable resin that is injected by said resin injection device through said first closure arrangement so as to be impregnated into said spaces between said reinforcing fibers in a resin-impregnated state;
        wherein said envelope seals said curable resin therein and prevents said resin from directly entering said mold cavity outside of said envelope and from directly contacting said first and second metal mold tools.

2. The forming system according to claim 1, wherein said envelope sleeve consists of an elastic plastic.

3. The forming system according to claim 1, wherein said envelope sleeve comprises a plastic film that is air-impermeable and resin-resistant.

4. The forming system according to claim 1, wherein said envelope sleeve has an elongated tubular shape.

5. The forming system according to claim 1, wherein said envelope sleeve has a flattened pillow shape that is longer and wider than it is high.

6. The forming system according to claim 1, wherein said first closure arrangement comprises a first collar arranged around said first end of said envelopes sleeve and a first plug fitted into said first end of said envelope sleeve fittingly inside said first collar to sealingly close said first end of said envelope sleeve.

7. The forming system according to claim 6, wherein said first closure arrangement further comprises a first aperture valve connected to said resin injection device and communicating through said first plug.

8. The forming system according to claim 7, wherein
    said envelope further comprises a second closure arrangement closing a second end of said envelope sleeve opposite said first end, and
    said second closure arrangement comprises a second collar arranged around said second end of said envelope sleeve, a second plug fitted into said second end of said envelope sleeve fittingly inside said second collar to sealingly close said second end of said envelope sleeve, and a second aperture valve communicating through said second plug.

9. The forming system according to claim 1, wherein said envelope is so configured, arranged and adapted, so that at least two open flow channels are formed along said preform body between said preform body and said envelope sleeve, and otherwise said envelope sleeve is tightly vacuum-fitted onto an outer surface of said preform body, when said envelope is sealed and evacuated around said preform body.

10. The forming system according to claim 1, further comprising a molding insert for shaping a contour of said preform body, wherein said molding insert is arranged outside of said preform body and enclosed within said envelope.

11. The forming system according to claim 1, wherein only said preform body without any insert component is arranged and enclosed within said envelope.

12. The forming system according to claim 1, wherein said forming system does not include a seal between said first and second metal mold tools, and said mold cavity when closed is not tightly sealed with respect to vacuum or said curable resin.

13. The forming system according to claim 1, wherein said envelope further includes a second closure arrangement closing a second end opposite said first end of said envelope sleeve, and further comprising a suction device connected to said second closure arrangement.

14. A method of operating the forming system according to claim 13, comprising the following steps:
    a) preparing said preform unit by arranging said reinforcing fibers in said envelope and then closing said closure arrangements;
    b) arranging said preform unit in said mold cavity between said first and second metal mold tools and closing said mold tools relative to each other;
    c) evacuating said preform unit by sucking gas out of said envelope through said second closure arrangement using said suction device; and
    d) injecting said curable resin into said preform unit through said first closure arrangement using said resin injection device while continuing to apply suction through said second closure arrangement using said suction device;
wherein said curable resin is confined within said envelope and there is no direct contact between said curable resin and said first and second metal mold tools.

* * * * *

UNITED STATES PATENT AND TRADEMARK OFFICE
CERTIFICATE OF CORRECTION

PATENT NO. : 6,517,769 B2
DATED : February 11, 2003
INVENTOR(S) : Eschenfelder et al.

It is certified that error appears in the above-identified patent and that said Letters Patent is hereby corrected as shown below:

<u>Title page,</u>
Item [57], ABSTRACT,
Line 4, after "enclosing the", replace "perform" by -- preform --;

<u>Column 1,</u>
Line 16, after "preform is", replace "resin-impregranted" by -- resin-impregnated --.

<u>Column 4,</u>
Line 34, after "via its", replace "value" by -- valve --;
Line 61, after "Both", replace "device" by -- devices --;

<u>Column 5,</u>
Line 58, after "end of said", replace "envelopes" by -- envelope --;

<u>Column 6,</u>
Line 49, before "evacuating", insert -- c) --.

Signed and Sealed this

Third Day of June, 2003

JAMES E. ROGAN
*Director of the United States Patent and Trademark Office*